United States Patent
Xu et al.

(10) Patent No.: US 11,745,396 B2
(45) Date of Patent: Sep. 5, 2023

(54) DEVICE AND METHOD FOR CONTROLLING TRANSVERSE AND LONGITUDINAL STRESS WAVES DURING CURING PROCESS OF ENERGETIC COMPOSITE MATERIALS

(71) Applicant: BEIJING INSTITUTE OF TECHNOLOGY, Beijing (CN)

(72) Inventors: Chunguang Xu, Beijing (CN); Peng Yin, Beijing (CN); Yuren Lu, Beijing (CN); Jianfeng Song, Beijing (CN); Wenyuan Song, Beijing (CN); Shuangyi Li, Beijing (CN)

(73) Assignee: BEIJING INSTITUTE OF TECHNOLOGY, Beijing (CN)

(*) Notice: Subject to any disclaimer, the term of this patent is extended or adjusted under 35 U.S.C. 154(b) by 96 days.

(21) Appl. No.: 17/188,171

(22) Filed: Mar. 1, 2021

(65) Prior Publication Data

US 2021/0347095 A1 Nov. 11, 2021

(30) Foreign Application Priority Data

Mar. 16, 2020 (CN) .......................... 202010183840.1

(51) Int. Cl.
 *B29C 35/02* (2006.01)
(52) U.S. Cl.
 CPC ...... *B29C 35/0261* (2013.01); *B29C 35/0227* (2013.01)
(58) Field of Classification Search
 CPC .................. B29C 35/0261; B29C 35/0227
 See application file for complete search history.

(56) References Cited

U.S. PATENT DOCUMENTS 2,768,072 A * 10/1956 Stark ............... F42B 12/204
 149/93
3,027,597 A * 4/1962 McCurdy ......... C06B 21/0058
 86/20.12
(Continued)

FOREIGN PATENT DOCUMENTS

CN 101398409 A * 4/2009
CN 102507369 A 6/2012
(Continued)

OTHER PUBLICATIONS

Machine translation CN106908177A (Year: 2017).*
(Continued)

*Primary Examiner* — Matthew J Daniels
*Assistant Examiner* — Wayne K. Swier
(74) *Attorney, Agent, or Firm* — John A. Miller; Shumaker, Loop & Kendrick, LLP

(57) ABSTRACT

The present application relates to the technical field of the research on energetic composite materials, and in particular to a device and a method for controlling transverse and longitudinal stress waves during the curing process of energetic composite materials. The device for controlling transverse and longitudinal stress waves comprises a curing vessel containing an energetic composite materials to be cured; a vertical exciter that is vertically incident to the curing vessel; and a plurality of oblique exciters which are arranged around the vertical exciter and obliquely incident to the curing vessel, wherein the oblique exciters have inclination angles between a first critical angle and a second critical angle. By means of incident transverse and longitudinal waves, the internal radial residual stress and the internal axial residual stress are reduced and homogenized, so as to improve stability and mechanical property of the energetic composite materials during curing.

10 Claims, 2 Drawing Sheets

(56) References Cited

U.S. PATENT DOCUMENTS

| | | | | |
|---|---|---|---|---|
| 3,155,552 A | * | 11/1964 | Vriesen | C08L 67/02 |
| | | | | 149/19.5 |
| 4,615,270 A | | 10/1986 | Bell | |
| 6,009,759 A | * | 1/2000 | Kibblewhite | F16B 31/02 |
| | | | | 73/761 |
| 2018/0208521 A1 | * | 7/2018 | Stephens | C06B 21/0058 |

FOREIGN PATENT DOCUMENTS

| | | | | |
|---|---|---|---|---|
| CN | 103076821 A | * | 5/2013 | G01L 1/255 |
| CN | 106908177 A | * | 6/2017 | G01L 1/255 |
| CN | 107084810 A | | 8/2017 | |
| CN | 109016563 A | | 12/2018 | |
| CN | 109628729 A | | 4/2019 | |
| CN | 109678629 A | | 4/2019 | |
| CN | 109797279 A | | 5/2019 | |
| EP | 2918690 A1 | * | 9/2015 | C21D 10/00 |
| WO | WO-2009091430 A1 | * | 7/2009 | C06B 21/0008 |

OTHER PUBLICATIONS

Machine translation CN101398409A (Year: 2009).*
Ultrasonic Acoustics Dec. 23, 2015; From University of Southern Mississippi; Computing https://www.usm.edu/sites/default/files/groups/school-computing/pdf/ultrasonic_acoustics.pdf (Year: 2015).*
Machine translation CN103076821A (Year: 2013).*

* cited by examiner

DEVICE AND METHOD FOR CONTROLLING TRANSVERSE AND LONGITUDINAL STRESS WAVES DURING CURING PROCESS OF ENERGETIC COMPOSITE MATERIALS

CROSS REFERENCE RELATED TO APPLICATIONS

This application claims the benefit of China Patent Application No. 202010183840.1, filed on Mar. 16, 2020. The entire disclosure of the above application is incorporated herein by reference.

TECHNICAL FIELD

The application relates to the technical field of the research on energetic composite materials, and in particular to a device and a method for controlling transverse and longitudinal stress waves during the curing process of energetic composite materials.

BACKGROUND

The curing stability of energetic composite materials such as propellants, PBX explosives, etc., is increasingly required in applications. For example, propellants are used as important fuels for aerospace. With the increasingly significant role of the aerospace industry in economic development, the safety requirements on the aerospace industry in engineering application are increasingly high, and the requirements on the mechanical property and the stability of the propellant are also increasing. The existence of residual stress of the propellant can directly cause cracks in the propellant grains and induce cracking and other phenomena, which will directly threaten the operational safety of space equipment. Therefore, further research is needed to reduce and homogenize the residual stress inside energetic composite materials such as propellants, PBX explosives, etc., so as to improve their curing stability and safety in applications.

In the prior art, the patent application with Publication No. CN109797279A and entitled "AN OPEN HIGH-ENERGY ACOUSTIC BEAM DEVICE FOR REDUCING RESIDUAL STRESS DURING THE CURING PROCESS OF PROPELLANTS", discloses that an open curing vessel is arranged with its center axis coincident with those of a high-energy acoustic beam transducer and a fastening device. The high-energy acoustic beam under such arrangement mode is a longitudinal wave, which mainly acts on axial residual stress according to the characteristic of the fluctuation direction of longitudinal wave particles. However, deformation and debonding is caused by the radial residual stress. Thus, it is required to improve the reduction and homogenization of the residual stress in the prior art.

SUMMARY

The application provides a device and a method for controlling transverse and longitudinal stress waves during the curing process of energetic composite materials. By means of incident transverse and longitudinal waves, the internal radial residual stress and the internal axial residual stress are reduced and homogenized, so as to improve stability and mechanical property of the energetic composite materials during curing.

The application provides a device for controlling transverse and longitudinal stress waves during the curing process of energetic composite materials, which comprises: a curing vessel containing energetic composite materials to be cured; a vertical exciter that is vertically incident to the curing vessel; and a plurality of oblique exciters which are arranged around the vertical exciter and obliquely incident to the curing vessel, wherein the oblique exciters have inclination angles between a first critical angle and a second critical angle.

Compared with the prior art, the device for controlling transverse and longitudinal stress waves provided by the present application, comprises the vertical exciter which is vertically incident to the curing vessel and the plurality of oblique exciters which are obliquely incident to the curing vessel, wherein the oblique exciters have inclination angles between the first critical angle and the second critical angle. During the curing process of the energetic composite materials to be cured from a colloidal state to a solid state in the curing vessel, the ultrasonic stress waves vertically incident into the energetic composite materials are mostly longitudinal waves, which mainly have the effect of reducing and homogenizing the axial residual stress in the energetic composite materials. The ultrasonic stress waves which are incident into the energetic composite materials at inclination angles between the first critical angle and the second critical angle, have both longitudinal waves and transverse waves, which can simultaneously reduce and homogenize the axial residual stress and the radial residual stress of the energetic composite materials, so as to control the multi-directional residual stress of the energetic composite materials, enhance the uniformity of solid particles of the energetic composite materials, and improve the mechanical property and stability of the energetic composite materials during curing. Moreover, the plurality of oblique exciters are provided and arranged around the vertical exciter, so the particles of the energetic composite materials with a multiphase mixture media in the curing vessel can be controlled by the transverse and longitudinal waves and move in a trajectory similar to a three-dimensional ellipsoid. This can further realize the reduction and homogenization of the residual stress inside the energetic composite materials in any direction, and further improve the uniformity of solid particles, so as to improve the mechanical property and stability during the curing process of the energetic composite materials.

Furthermore, a transmitting end of the vertical exciter and transmitting ends of the plurality of oblique exciters are combined into an integrated transmitting end.

Compared with the solutions in which a plurality of exciters separately inserted into the curing vessel are provided, such an arrangement allows to further reduce the acoustic interface and acoustic attenuation and improve the energy transfer efficiency.

Further, the integrated transmitting end is provided with a first acoustic wedge that is vertically incident and a plurality of second acoustic wedges that are obliquely incident, and the first acoustic wedge is correspondingly coupled with the transmitting end of the vertical exciter, and the second acoustic wedges are correspondingly coupled with the transmitting ends of the oblique exciters.

The specific arrangement can realize the integration of the transmitting ends of the plurality of exciters in a simple, direct and efficient way.

Furthermore, the first acoustic wedge is arranged at a central position of the integrated transmitting end, and the plurality of second acoustic wedges are uniformly arranged around the first acoustic wedge.

Such an arrangement is more conducive to the uniformity of overall stress control and reduction during the curing process of the energetic composite materials, so as to improve the uniformity of solid particles, and improve the mechanical property and stability during the curing process of the energetic composite materials.

Further, a top of the curing vessel is coupled with the integrated transmitting end, and the vertical exciter is arranged corresponding to a central position of the top of the curing vessel, and the oblique exciters are uniformly arranged around the vertical exciter.

Such an arrangement is more conducive to the uniformity of overall stress control and reduction during the curing process of the energetic composite materials, so as to improve the uniformity of solid particles, and improve the mechanical property and stability during the curing process of the energetic composite materials.

Furthermore, one vertical exciter is provided and arranged corresponding to the central position of the top of the curing vessel, and three oblique exciters are provided and arranged uniformly around the vertical exciter.

The number of the exciters can be specifically set according to the amount of the energetic composite materials to be cured, the volume of the curing vessel and/or the like, so as to obtain a better reasonable setting mode.

Further, a plurality of vertical exciters are provided and uniformly distributed corresponding to the central position of the top of the curing vessel.

Such an arrangement can enhance the incidence of longitudinal wave energy and improve the reduction and homogenization efficiency of axial residual stress.

Furthermore, the curing vessel has a tank structure, and an edge of the integrated transmitting end is fixedly connected with a top edge of the curing vessel.

Such an arrangement can further ensure that the curing process of the energetic composite materials is carried out efficiently.

Further, the oblique exciters have the same or different inclination angles.

The oblique exciters have inclination angles between the first critical angle and the second critical angle, and the inclination angles have a large adjustment range. The inclination angle of each oblique exciter can be selected from any angle within the range as required, and different oblique exciters have the same or different inclination angles. This can realize an optimal transverse and longitudinal wave control scheme, achieve the best reduction and homogenization effects of residual stress during the curing process of the energetic composite materials, achieve the best stability, and further achieve the maximization of safety in application.

Further, an inner wall surface of the curing vessel is uniformly coated with a release agent.

Such an arrangement can make it easier to remove the cured energetic composite materials when taken out, ensure the integrity of the energetic composite materials, and make it more convenient to reuse the curing vessel multiple times.

The application provides a method for controlling transverse and longitudinal stress waves during the curing process of energetic composite materials, comprising: causing, by a vertical exciter, vertical incidence of ultrasonic waves to a curing vessel containing energetic composite materials to be cured; and causing, by a plurality of oblique exciters arranged around the vertical exciter, oblique incidence of ultrasonic waves to the curing vessel, wherein the oblique exciters have inclination angles between a first critical angle and a second critical angle.

Further, the vertical exciter is arranged corresponding to a central position of the top of the curing vessel, and the oblique exciters are uniformly arranged around the vertical exciter.

Further, the oblique exciters have the same or different inclination angles.

It should be understood that the above general description and the later detailed description are only exemplary and are not intended to limit the present application.

Figure 1:
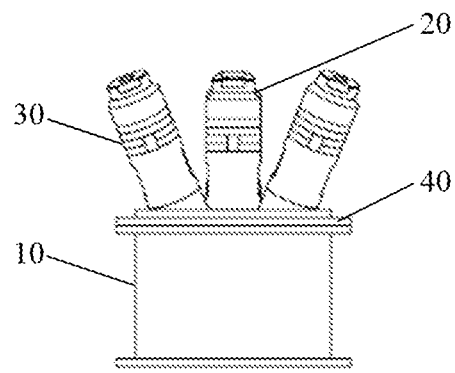
FIG. 1 is a schematic structural diagram of a device for controlling transverse and longitudinal stress waves according to an embodiment of the present application.

Reference Numerals are as Follows:
10—a curing vessel;
20—a vertical exciter;
30—an oblique exciter;
40—an integral transmitting end;
41—a first acoustic wedge;
42—a second acoustic wedge;
43—connecting holes.

The accompanying drawings, which are incorporated into the specification and constitute a part of this specification, illustrate embodiments according to the application and are intended to explain the principle of the application together with the specification.

DETAILED DESCRIPTION

The present application will be further described in detail below through specific embodiments in conjunction with the figures.

Figure 2:
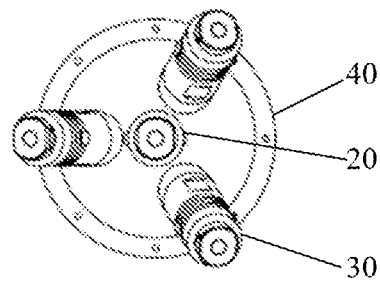
FIG. 2 is a top view of the device for controlling transverse and longitudinal stress waves according to an embodiment of the present application.
Figure 3:
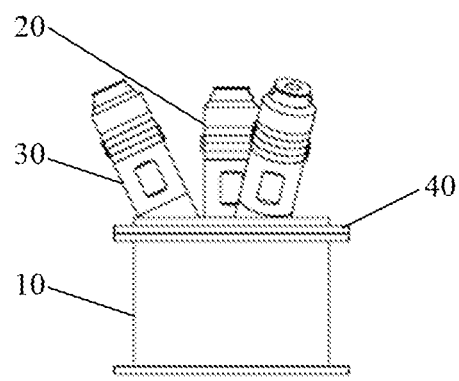
FIG. 3 is a schematic structural view of another angle of the device for controlling transverse and longitudinal stress waves according to an embodiment of the present application.

As shown in FIGS. 1-3, embodiments of the present application provide a device for controlling transverse and longitudinal stress waves during the curing process of energetic composite materials, wherein the energetic composite materials may include, for example, an energetic material formed by being casted and solidified, and may specifically be propellants, PBX explosives, etc. The device for controlling transverse and longitudinal stress waves comprises a curing vessel 10 containing energetic composite materials to be cured. The Liquid or colloidal energetic composite materials to be cured can be injected into an inside of the curing vessel 10 from the top of the curing vessel. The curing vessel 10 may have a tank structure which can be a cylinder, a square column, an irregular column or the like. Its specific shape is not limited, and is preferably cylindrical. The curing vessel 10 may be made of a metal or alloy material, as long as it does not react with the energetic composite materials inside it to destroy its structure and does not reduce the energy transmitted by the ultrasonic stress waves in the curing vessel 10. For example, the curing vessel 10 may be made of an aluminum alloy material, which has the advantages of light weight and uneasy deformation. Preferably, the inner wall surface of the curing vessel 10 can be evenly coated with a release agent, in order to make it easier to remove the cured energetic composite materials when taken out, to ensure the integrity of the energetic composite materials, and to make it more convenient to reuse the curing vessel 10 multiple times.

The energetic materials are formed by using composite materials as the matrix, and solidifying and bonding energetic solid particles to form the required grains. In the energetic materials, the volume fraction of solid particles is extremely high. For example, the volume fraction of solid particles in PBX explosives may be as high as 98% or more, and the second propellant may reach 75% or more.

Transverse waves usually propagate in solids, while longitudinal waves usually propagate in solids, liquids and gases. The energetic materials formed by being casted and solidified include viscous fluid (liquid) substances, viscoelastic (solid-liquid mixed state) substances and highly elastic (solid) substances during the curing process. Wherein, in the viscous fluid (liquid) substances, there are a lot of longitudinal waves and very few transverse waves. In the viscoelastic (solid-liquid mixed state) substances, there are transverse and longitudinal waves, but longitudinal waves are dominant and transverse waves are few. In highly elastic (solid) substances, there are transverse and longitudinal waves.

The device for controlling transverse and longitudinal stress waves according to an embodiment of the present application further includes a plurality of exciters, and specifically includes a vertical exciter 20 which is vertically incident to the curing vessel 10, and a plurality of oblique exciters 30 which are disposed around the vertical exciter 20 and obliquely incident to the curing vessel 10. The oblique exciters 30 have inclination angles between a first critical angle and a second critical angle. The first critical angle is defined as follows: a refraction angle of a light ray is larger than an incident angle of the light ray when the light ray is emitted from an optically dense medium to an optically rarer medium, and the incident angle corresponding to the refraction angle of 90 degrees is called as the first critical angle. The second critical angle is defined as follows: a refraction angle of a light ray is larger than an incident angle of the light ray when a light ray is emitted from an optically dense medium to an optically rarer medium, and the refraction angle corresponding to the incident angle of 0 degree is called as the second critical angle. The exciter is a device that converts the input electric power into mechanical power (i.e., ultrasonic waves) and then transmits it, while consuming a small part of its own power.

Waves will be refracted when the waves propagate from one medium to another medium, so that the waves will propagate at many angles when the waves propagate in the energetic materials. When there are many oblique exciters, the waves propagate without dead angles in the material, and the waves will be superimposed when the size of the curing container 10 is small.

Compared with the prior art, during the curing process of the energetic composite materials to be cured from a colloidal state to a solid state in the curing vessel 10, the ultrasonic stress waves emitted by the vertical exciter 20 and vertically incident into the energetic composite materials are mostly longitudinal waves, which mainly have the effect of reducing and homogenizing the axial residual stress in the energetic composite materials, and the ultrasonic stress waves emitted by the oblique exciters 30 and incident into the energetic composite materials have both longitudinal waves and transverse waves, which can simultaneously reduce and homogenize the axial residual stress and the radial residual stress of the energetic composite materials, so as to control the multi-directional residual stress of the energetic composite materials, enhance the uniformity of solid particles of the energetic composite materials, and improve the mechanical property and stability of the energetic composite materials during curing. Moreover, the plurality of oblique exciters 30 are provided and arranged around the vertical exciter 20, so the particles of the energetic composite materials with a multiphase mixture media in the curing vessel 10 can be controlled by the transverse and longitudinal waves and move in a trajectory similar to a three-dimensional ellipsoid. This can further realize the reduction and homogenization of the residual stress in any direction inside the energetic composite materials, further improve the uniformity of solid particles, and improve the mechanical property and stability of the energetic composite materials during curing.

Figure 4:
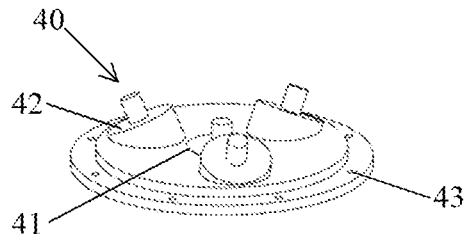
FIG. 4 is a schematic structural diagram of an integrated transmitting end according to an embodiment of the present application.
Figure 5:
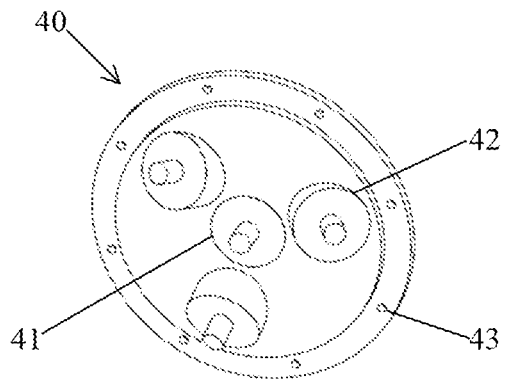
FIG. 5 is a schematic structural diagram of another angle of the integrated transmitting end according to an embodiment of the present application.

In order to minimize the acoustic interface, reduce the acoustic attenuation, and improve the energy transfer efficiency, the transmitting end of the vertical exciter 20 and the transmitting ends of the plurality of oblique exciters 30 are combined into an integrated transmitting end 40. In a specific embodiment, as shown in FIGS. 4 and 5, the integrated transmitting end 40 may be provided with a first acoustic wedge 41 incident in a vertical direction and a plurality of second acoustic wedges 42 incident in an oblique direction. The first acoustic wedge 41 is correspondingly coupled to the transmitting end of the vertical exciter 20, and the second acoustic wedges 42 are correspondingly coupled to the transmitting ends of the oblique exciters 30. Such an arrangement can realize the integration of the transmitting ends of a plurality of exciters in a simple, direct and efficient way.

In a further embodiment, the first acoustic wedge 41 may be arranged at a central position of the integrated transmitting end 40, and the plurality of second acoustic wedges 42 may be evenly arranged around the first acoustic wedge 41. In particular, three second acoustic wedges 42 can be provided. The number of second acoustic wedges 42 may be specifically set according to the amount of the energetic composite materials to be cured, the volume of the curing vessel 10 and/or the like. Such an arrangement is more conducive to the uniformity of overall stress control and reduction during the curing process of the energetic composite materials, the enhancement of the uniformity of solid particles, and the improvement of the mechanical property and stability during the curing process of the energetic composite materials.

The aforementioned integrated transmitting end 40 can be coupled with the top of the aforementioned curing vessel 10, and the edge of the integrated transmitting end 40 can also be tightly connected with the top edge of the curing vessel 10, so as to further ensure the effective curing process of the energetic composite materials. Specifically, the edge of the integrated transmitting end 40 can be uniformly provided with connecting holes 43 for the tight connection of the transmitting end and the curing vessel.

In an embodiment, the vertical exciter(s) 20 may be arranged corresponding to the central position of the top of the curing vessel 10, and one or a plurality of vertical exciters 20 may be provided. When one vertical exciter 20 is provided, it is arranged corresponding to a central position of the top of the curing vessel 10; when the plurality of vertical exciters 20 are provided, they are uniformly distributed corresponding to the central position of the top of the curing vessel 10. Such an arrangement can enhance the incidence of longitudinal wave energy, and improve the reduction and homogenization efficiency of the axial residual stress. Furthermore, the plurality of oblique exciters 30 are uniformly arranged around the one or plurality of vertical exciters 20. Three oblique exciters 30 may be provided, and the number of oblique exciters may be specifically set according to the amount of the energetic composite materials to be cured, the volume of the curing vessel 10, etc. Such an arrangement is more conducive to the uniformity of overall stress control and reduction during the curing process of the energetic composite materials, the enhancement of the uniformity of solid particles, and the improvement of the mechanical property and stability during the curing process of the energetic composite materials.

In addition, the inclination angles of the oblique exciters 30 are between the first critical angle and the second critical angle, which has a large adjustment range. The inclination angles of the oblique exciters 30 can be selected from any angles within the range as required, and the oblique exciters 30 have the same or different inclination angles, so as to realize an optimal transverse and longitudinal wave control scheme, achieve the best reduction and homogenization effects of residual stress during the curing process of the energetic composite materials, achieve the best stability, and further achieve the maximization of safety in application.

Figure 6:
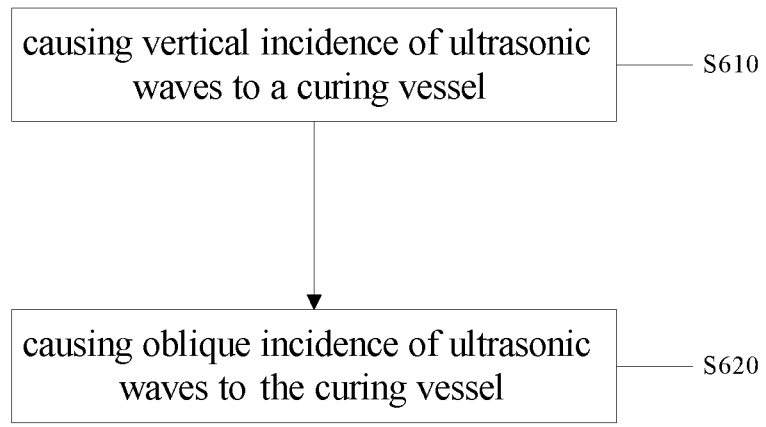
FIG. 6 is a flowchart of a method for controlling transverse and longitudinal stress waves according to an embodiment of the present application.

FIG. 6 shows a flowchart of a method for controlling transverse and longitudinal stress waves according to an embodiment of the present application. The method may include: a step S610 of causing, by a vertical exciter, vertical incidence of ultrasonic waves to a curing vessel containing energetic composite materials to be cured; and a step S620 of causing, by a plurality of oblique exciters arranged around the vertical exciter, oblique incidence of ultrasonic waves to the curing vessel, wherein the oblique exciters have inclination angles between a first critical angle and a second critical angle.

Optionally, the vertical exciter is arranged corresponding to a central position of the top of the curing vessel, and the oblique exciters are uniformly arranged around the vertical exciter.

Optionally, the oblique exciters have the same or different inclination angles.

The above embodiments are only preferred embodiments of the present application and are not intended to limit the present application, and various modifications and changes may be made to the present application by those skilled in the art. Any modification, equivalent replacement, or improvement made within the spirit and principle of the present application shall be included in the protection scope of the present application.

The invention claimed is:

1. A device for controlling transverse and longitudinal stress waves during the curing process of energetic composite materials, comprising:
a curing vessel containing energetic composite materials to be cured;
a vertical exciter that is vertically incident to the curing vessel; and
a plurality of oblique exciters arranged around the vertical exciter and obliquely incident to the curing vessel, wherein the oblique exciters have inclination angles between a first critical angle and a second critical angle and emit ultrasonic stress waves to reduce and homogenize axial residual stress and radial residual stress of the energetic composite materials and
wherein an incident angle corresponding to a refraction angle of 90 degrees is the first critical angle, and
a refraction angle corresponding to an incident angle of 0 degrees is the second critical angle.

2. The device for controlling transverse and longitudinal stress waves according to claim 1, wherein a transmitting end of the vertical exciter and transmitting ends of the plurality of oblique exciters are combined into an integrated transmitting end.

3. The device for controlling transverse and longitudinal stress waves according to claim 2, wherein
the integrated transmitting end is provided with a first acoustic wedge that is vertically incident and a plurality of second acoustic wedges that are obliquely incident, and
the first acoustic wedge is correspondingly coupled with the transmitting end of the vertical exciter, and the second acoustic wedges are correspondingly coupled with the transmitting ends of the oblique exciters.

4. The device for controlling transverse and longitudinal stress wave according to claim 3, wherein
the first acoustic wedge is arranged at a central position of the integrated transmitting end, and the second acoustic wedges are uniformly arranged around the first acoustic wedge.

5. The device for controlling transverse and longitudinal stress waves according to claim 2, wherein
a top of the curing vessel is coupled with the integrated transmitting end, and
the vertical exciter is arranged corresponding to a central position of the top of the curing vessel, and the oblique exciters are uniformly arranged around the vertical exciter.

6. The device for controlling transverse and longitudinal stress waves according to claim 5, wherein
one vertical exciter is provided and arranged corresponding to the central position of the top of the curing vessel, and three oblique exciters are provided and arranged uniformly around the one vertical exciter.

7. The device for controlling transverse and longitudinal stress waves according to claim 5, wherein
a plurality of vertical exciters are provided and uniformly distributed corresponding to the central position of the top of the curing vessel.

8. The device for controlling transverse and longitudinal stress waves according to claim 2, wherein
the curing vessel has a tank structure, and an edge of the integrated transmitting end is fixedly connected with a top edge of the curing vessel.

9. The device for controlling transverse and longitudinal stress waves according to claim 1, wherein the oblique exciters have the same or different inclination angles.

10. The device for controlling transverse and longitudinal stress waves according to claim 1, wherein
an inner wall surface of the curing vessel is uniformly coated with a release agent.

* * * * *